United States Patent
Burd

(10) Patent No.: US 9,328,543 B2
(45) Date of Patent: May 3, 2016

(54) GALLEY CART BAY DOOR LATCH

(71) Applicant: B/E Aerospace, Inc., Wellington, FL (US)

(72) Inventor: Peter John Leslie Burd, Carmarthenshire (GB)

(73) Assignee: B/E Aerospace, Inc., Wellington, FL (US)

( * ) Notice: Subject to any disclaimer, the term of this patent is extended or adjusted under 35 U.S.C. 154(b) by 218 days.

(21) Appl. No.: 14/091,045

(22) Filed: Nov. 26, 2013

(65) Prior Publication Data

US 2014/0152027 A1    Jun. 5, 2014

Related U.S. Application Data

(60) Provisional application No. 61/731,275, filed on Nov. 29, 2012.

(51) Int. Cl.

| | |
|---|---|
| *E05C 3/06* | (2006.01) |
| *E05C 19/00* | (2006.01) |
| *E05C 3/14* | (2006.01) |
| *B64D 11/04* | (2006.01) |
| *E05C 19/04* | (2006.01) |
| *E05B 13/00* | (2006.01) |

(Continued)

(52) U.S. Cl.
CPC . *E05C 3/14* (2013.01); *B64D 11/04* (2013.01); *E05C 19/009* (2013.01); *E05C 19/04* (2013.01); *B64D 11/0007* (2013.01); *E05B 13/004* (2013.01); *E05C 3/16* (2013.01); *Y02T 50/46* (2013.01); *Y10T 292/108* (2015.04)

(58) Field of Classification Search
CPC ......... E05C 3/16; E05C 19/009; E05C 19/04; E05C 19/14; E05B 13/004; E05B 15/006; B64D 11/0007
USPC ............ 292/103, 200, 204, 247, 252, 256.69, 292/DIG. 15, DIG. 49, DIG. 70, DIG. 71
See application file for complete search history.

(56) References Cited

U.S. PATENT DOCUMENTS

| | | | | |
|---|---|---|---|---|
| 480,688 | A | * | 8/1892 | Bennett .......................... 292/207 |
| 1,851,612 | A | * | 3/1932 | Werth ............................ 292/338 |

(Continued)

FOREIGN PATENT DOCUMENTS

| | | |
|---|---|---|
| DE | 102007029677 A1 | 1/2009 |
| FR | 2646683 A1 | 11/1990 |

(Continued)

OTHER PUBLICATIONS

International Search Report, May 20, 2014, 6 pages.

(Continued)

*Primary Examiner* — Carlos Lugo
(74) *Attorney, Agent, or Firm* — Fulwider Patton LLP

(57) ABSTRACT

A galley cart bay door latch system serves to secure catering or galley carts, as are used on commercial aircraft, within the aircraft's galley. The system relies on two substantially horizontally disposed latch levers to secure the galley door which in turn restrains a galley cart in position within the galley. The ends of the latch levers are received in a recess formed in the door to secure the door. Raising the latch lever releases the door and positively pushes the door outwardly. The latching configuration allows the doors to be slammed shut without the need to further manipulate the latch levers.

18 Claims, 6 Drawing Sheets

(51) Int. Cl.
*B64D 11/00* (2006.01)
*E05C 3/16* (2006.01)

(56) References Cited

U.S. PATENT DOCUMENTS

| | | | |
|---|---|---|---|
| 2,109,759 A * | 3/1938 | Tuchband | 24/517 |
| 2,649,322 A | 8/1953 | Mack | |
| 2,721,751 A | 10/1955 | Holritz | |
| 2,871,048 A | 1/1959 | Balogh | |
| 3,600,916 A | 8/1971 | Ruppert | |
| 3,618,995 A * | 11/1971 | McLean | 292/66 |
| 3,782,765 A * | 1/1974 | Wallyn | 292/103 |
| 3,985,380 A * | 10/1976 | Raivio | 292/69 |
| 4,438,964 A | 3/1984 | Peters | |
| 4,911,487 A | 3/1990 | Rachocki | |
| 5,234,238 A | 8/1993 | Takimoto | |
| 5,605,344 A | 2/1997 | Insalaco et al. | |
| 5,630,630 A | 5/1997 | Price et al. | |
| 5,765,883 A * | 6/1998 | Dessenberger et al. | 292/92 |
| 5,769,469 A * | 6/1998 | Zemke | 292/241 |
| 5,887,916 A * | 3/1999 | Finkelstein et al. | 292/241 |
| 5,927,772 A | 7/1999 | Antonucci et al. | |
| 5,975,597 A | 11/1999 | Makiuchi et al. | |
| 6,010,094 A * | 1/2000 | Csik et al. | 244/129.1 |
| 6,152,501 A | 11/2000 | Magi et al. | |
| 6,349,982 B2 | 2/2002 | Fayngersh et al. | |
| 6,398,272 B1 * | 6/2002 | Plummer et al. | 292/246 |
| 6,412,834 B1 * | 7/2002 | Waitai et al. | 292/197 |
| 6,612,628 B1 * | 9/2003 | Herbst | 292/263 |
| 7,065,992 B2 | 6/2006 | Talukdar et al. | |
| 7,458,441 B2 | 12/2008 | Hu | |
| 7,544,915 B2 | 6/2009 | Hu | |
| 7,562,914 B2 | 7/2009 | Bassi | |
| 8,186,191 B2 | 5/2012 | Bacon | |
| 8,269,627 B2 | 9/2012 | Gore et al. | |
| 8,347,667 B2 | 1/2013 | Bacon | |
| 8,393,187 B2 | 3/2013 | Bacon | |
| 8,910,819 B2 * | 12/2014 | Seiders | 220/326 |
| 2003/0111845 A1 | 6/2003 | Sadler | |
| 2004/0169378 A1 | 9/2004 | Hodgin et al. | |
| 2006/0038414 A1* | 2/2006 | Jien | 292/241 |
| 2006/0087131 A1 | 4/2006 | Bassi | |
| 2008/0110892 A1* | 5/2008 | House | 220/324 |
| 2008/0295291 A1 | 12/2008 | Lee | |
| 2010/0117379 A1 | 5/2010 | Mitchell et al. | |
| 2012/0025679 A1 | 2/2012 | Roering | |
| 2012/0205922 A1* | 8/2012 | Choi | 292/270 |
| 2013/0257065 A1 | 10/2013 | Burd | |

FOREIGN PATENT DOCUMENTS

| | | | | |
|---|---|---|---|---|
| GB | 1316268 A | | 5/1973 | |
| GB | 2306553 A * | | 5/1997 | E05C 3/14 |
| GR | 158780 A | | 2/1921 | |
| WO | 0146543 A2 | | 6/2001 | |
| WO | WO 2008060121 A1 * | | 5/2008 | E05C 17/16 |
| WO | 2013149051 A1 | | 10/2013 | |
| WO | 2013149072 A1 | | 10/2013 | |

OTHER PUBLICATIONS

EPO, International Search Report and Written Opinion in International Patent Appln. No. PCT/US2013/034462 dated Aug. 6, 2013.

* cited by examiner

GALLEY CART BAY DOOR LATCH

CROSS-REFERENCES TO RELATED APPLICATIONS

This application is based upon and claims priority from U.S. Provisional Application No. 61/731,275, filed Nov. 29, 2012, incorporated by reference in its entirety.

BACKGROUND

The invention generally relates to aircraft galleys, and more particularly pertains to a system for releasably latching a door of a galley cart bay for releasably retaining an aircraft galley cart within the galley cart bay for storing and serving food on aircraft.

On commercial aircraft with in-flight catering services, carts are used to transport meals from the galley to the passengers in the cabin. Such carts are typically retained in the galley with turn buttons that include arms that rotate about an axis that is perpendicular to the front face of galley. Rotation of the arms downwardly serves to retain the carts in their stowed position within the galley.

With the current trend towards the "air over" method of cart chilling which requires the cart bays to have doors, the turn buttons have to be placed on the outside of the doors, which results in an undesirable increase in the depth of a galley, a poor aesthetic appearance and ergonomic disadvantages although the doors may be used for retention. While location of the arms inside the doors results in a better aesthetic appearance and ergonomics, it does increase the work deck height and potential cold bridge issues through the doors themselves. In such configuration the doors are not normally used for retention (with the possible exception of cart kick-up loads) although additional door latching is required to secure the doors themselves. To release the carts both turn buttons need to be stowed which requires the use of both hands or a repeated single action. With this configuration there is no simultaneous slam facility in the event of a need for rapid stowage during an emergency.

To secure the carts or compartment doors, the turn buttons are attached to a substantial work deck beam in order to withstand the twisting force imposed on their rear face by forward momentum of fully loaded carts under simulated emergency conditions. The beam is usually manufactured from aluminum, heavy and can form another cold bridge within the chilled cart compartment.

A galley cart latching system is needed that is capable of effectively and efficiently securing galley carts and their contents in an aircraft's galley while overcoming the disadvantages of previously known systems. The present invention meets these and other needs.

SUMMARY OF THE INVENTION

Briefly, and in general terms, the present invention provides a latching system for securing galley carts in an aircraft's galley. The latching system allows one handed operation of both primary and secondary cart door retainers simultaneously, eliminates requirement for additional cart bay door latches or door handles, assists in opening the cart bay door and slam locks to automatically return to an engaged position to provide for failsafe capability, is substantially concealed to improve galley aesthetics, may be manufactured from carbon fiber reinforced composite materials to eliminate cold bridge problems in chilled galleys, does not significantly add to the depth requirement in a reduced foot print galley and the galley work deck beam can be substantially reduced in size or replaced with individual attachment points to reduce weight and cold bridge issues.

The present invention accordingly provides for a latching system including a latch for latching and unlatching a door of a galley cart bay of an aircraft galley for receiving an aircraft galley cart within the galley cart bay and releasably retaining the aircraft galley cart within the galley cart bay. The latch includes one or more latch levers, an inner end of the one or more latch levers being pivotally mounted to the aircraft galley, and an outer end of the one or more latch levers including a lever retainer member releasably engageable with a portion of the galley cart bay door. The outer end of the one or more latch levers are pivotally movable between a door engaging position engaging the galley cart bay door and retaining the galley cart bay door in a closed position of the door, and a door releasing position releasing the galley cart bay door to move to the open position of the door for releasing the aircraft galley cart for removal from the galley cart bay.

In a presently preferred aspect, the inner end of the one or more latch levers includes a mounting boss including upper and lower detent stops, the inner end of the one or more latch levers is pivotally mounted in a support bracket connected to the aircraft galley, and the support bracket includes a detent biased outwardly to alternatingly removably engage one of the upper and lower detent stops of the mounting boss. In another presently preferred aspect, the detent is a spring loaded detent. In another presently preferred aspect, the detent includes a spring loaded ball bearing located in a hole in the support bracket. In another presently preferred aspect, the upper and lower detent stops are formed by hemispherical recesses in the mounting boss.

In another presently preferred aspect, the inner end of the one or more latch levers include a cam slot releasably engageable with a cam operated rod slidably mounted between the cam slot and an interior side of the cart bay door. In another presently preferred aspect, a compression spring is disposed intermediate the cam slot and the cam operated rod, and the compression spring is biased to cause the cam operated rod to push outwardly against the cart bay door when the cart bay door is in the closed position and when the one or more latch levers is moved to the open position. In another presently preferred aspect, the lever retainer member comprises a lever T bar retainer member.

In another presently preferred aspect, the lever receiving portion of the galley cart bay door includes one or more positive location nubs extending outwardly from the galley cart bay door and the lever retainer member is releasably engageable with the one or more positive location nubs in the door engaging position of the outer end of the one or more latch levers. In another presently preferred aspect, a door seal is disposed between an interior side of the galley cart bay door and the galley cart bay for sealing the galley cart bay door against the galley cart bay in the closed position of the galley cart bay door, and the one or more positive location nubs are configured to cause the one or more latch levers to compress the door seal against the galley cart bay in the closed position of the latch lever when the galley cart bay door is closed and the outer end of the one or more latch levers is in the door engaging position, such that positive closure of the galley cart bay door is achieved by depressing the one or more latch levers past the one or more positive location nubs. In another presently preferred aspect, wherein the one or more positive location nubs include first and second positive location nubs, and positive closure is achieved by depressing the one or more latch levers past the first and second positive location nubs. In another presently preferred aspect, when the galley cart bay door is moved to the closed position, the cam rod is pushed against the compression spring and the cam slot, and is operative to move the one or more latch levers to the door engaging position.

In another presently preferred aspect, the one or more latch levers include first and second latch levers independently releasably engageable with the portion of the galley cart bay door. In another presently preferred aspect, the first and second latch levers are mounted in a support bracket, the inner ends of the first and second latch levers each include a mounting boss including upper and lower detent stops, the inner ends of the first and second latch levers each are pivotally mounted in a support bracket connected to the aircraft galley, and the support bracket include one or more detents biased outwardly to alternatingly removably engage one of the upper and lower detent stops of the mounting bosses of the first and second latch levers to provide independent primary and secondary latching of the cart bay door.

The first and second latch levers are typically substantially horizontally disposed latch levers that extend from the galley support frame. Each latch lever typically has a T-bar end that is received in a recess formed in the upper portion of the galley door to secure the door. The galley door serves to restrain a cart in position within the galley. To release the door, both latch levers can be lifted simultaneously to an upper detent position allowing the latch levers to pass through a slot in the door. On closure, the latch levers re-engage in their respective recesses automatically. No additional door latch or handle is required and the whole mechanism can be mounted and operates within a 1 inch space limitation. The latch levers may be manufactured from metallic or non-metallic materials, particularly high strength alloys or carbon fiber reinforced composite due to the linear nature of the applied load path.

These and other features and advantages of the present invention will become apparent from the following detailed description of preferred embodiments which, taken in conjunction with the accompanying drawings, illustrate by way of example the principles of the invention.

DETAILED DESCRIPTION OF THE PREFERRED EMBODIMENTS

Figure 1:
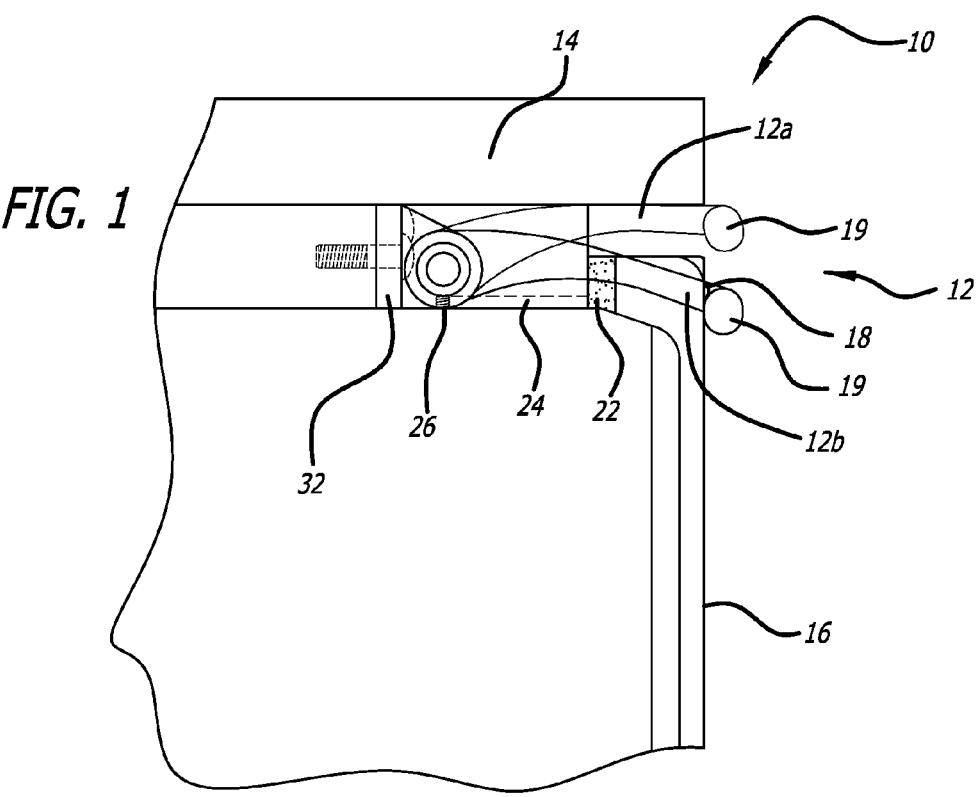
FIG. 1 is a schematic side view of a preferred embodiment of the galley cart door retaining system of the present invention.
Figure 2:
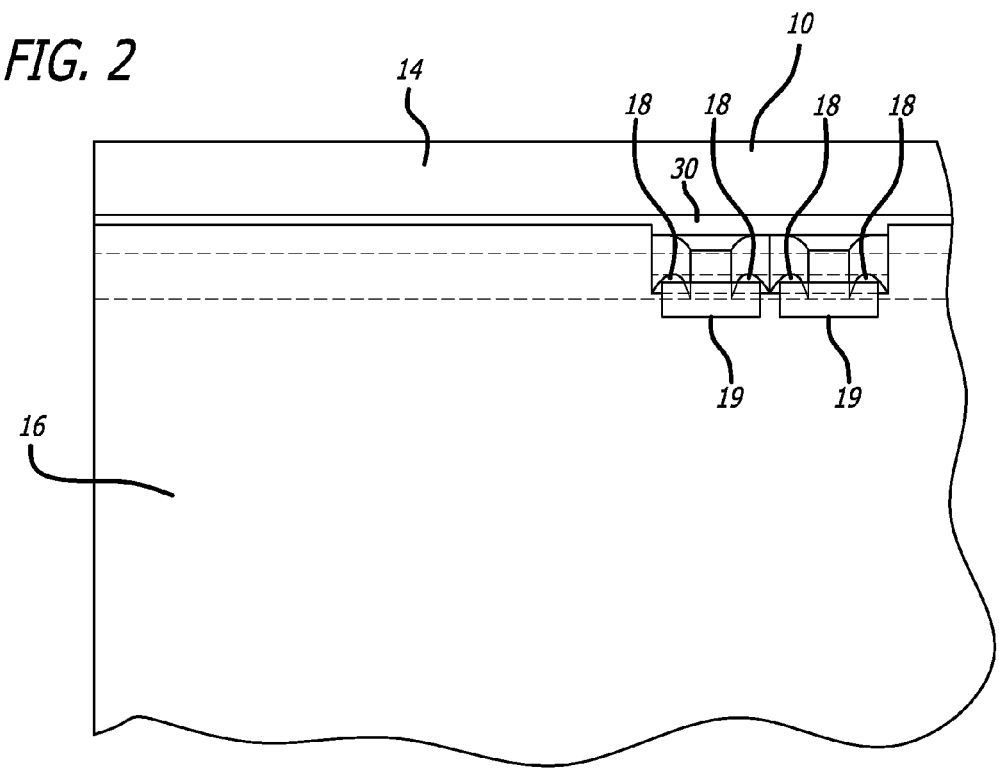
FIG. 2 is a schematic front view of the galley cart door retaining system shown in FIG. 1.

The present invention provides for a galley cart door bay door retaining or latching system including a latch 10 for use on galley carts as are used in commercial aircraft. The latch includes one or more latch levers 12 pivotally mounted on a galley 14. FIGS. 1 and 2 show a side view and a front view, respectively, of the galley cart door bay door retaining or latching system and more particularly show first and second latch levers 12a, 12b mounted on the galley, wherein the first latch lever 12a is shown disengaged and the second latch lever 12b is shown engaged in the cart bay door 16. The door is provided with positive location nubs 18 that give a positive engagement for a lever retainer member 19, such as a lever T bar retainer, for example, at an outer end 20 of the latch lever, while the door seal 22 is compressed by action of closing the door. The galley cart door bay door retaining or latching system provides independent primary and secondary latching of the cart bay door.

In addition, the latch levers utilize a cam operated rod 24 that performs two functions—upon raising the latch levers to an upper detent position, the compression spring 26 is compressed and the rod is pushed against the door by the cam slot 28 to propel the cart bay door outwardly allowing a space or slot 30 above the door to be used as a handle or grip for opening the door further. On closure, the rod operates in reverse, the closure of the door pushing it backwards against the spring and cam slot base and re-engaging the latch levers automatically. Positive closure is achieved by further depressing the latch levers past the location nubs. Both latch levers are mounted in a common support bracket, frame or plate 32.

Figure 3:
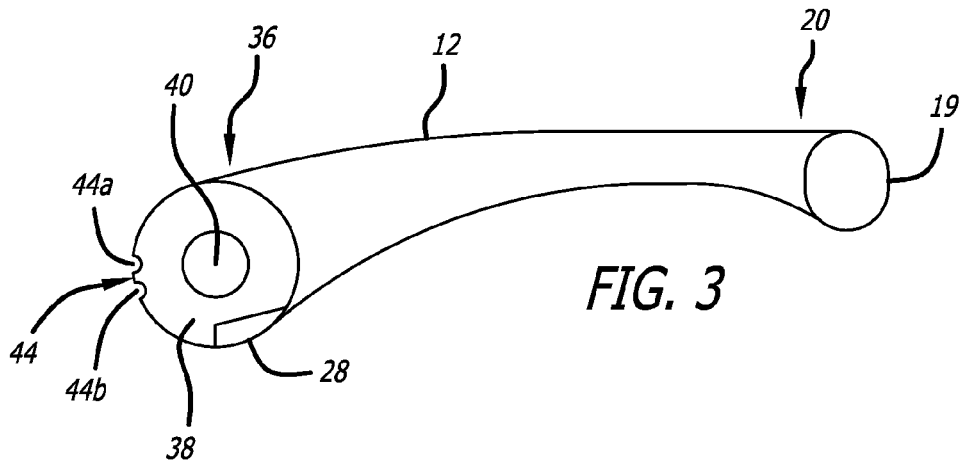
FIG. 3 is a side view of the latch lever of the latching system shown FIGS. 1 and 2 in its raised position and detached from its mounting.
Figure 4A:
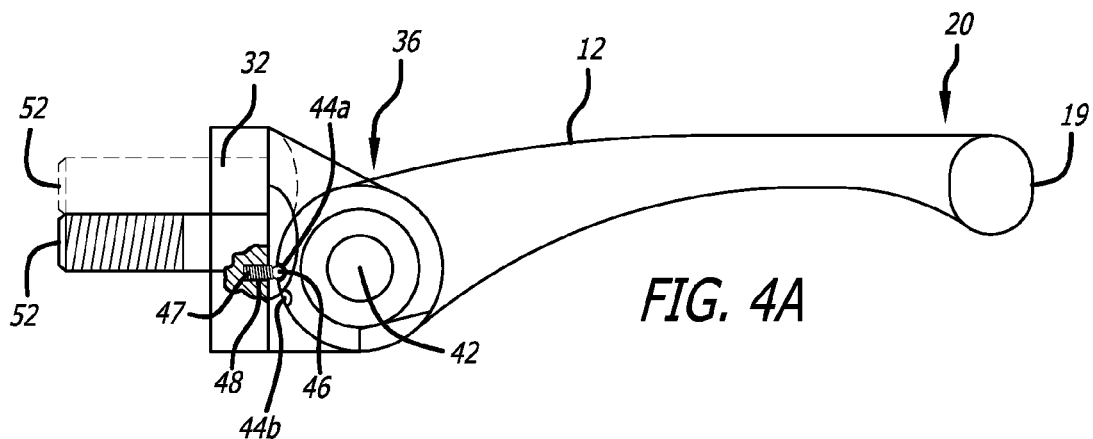
FIG. 4A is a side view of the latch lever of the latching system shown FIGS. 1 and 2 in its raised position and attached to its mounting.
Figure 4B:
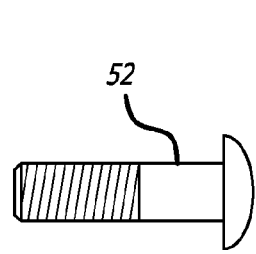
FIG. 4B is a side view of a through bolt for securing the support bracket of FIG. 4A.
Figure 4C:
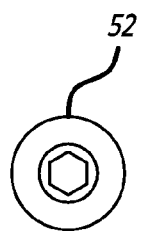
FIG. 4C is an end view of the through bolt of FIG. 4B.

FIGS. 3-10 show the latch levers and associated elements in more detail. In FIG. 3, a latch lever is shown detached from its mounting and in the raised detent position. Two detent positions, stops or slots and the cam slot are visible. At the inner end or root 36 of the latch lever is the mounting boss 38 with a through hole 40 for pivot pin 42. The mounting boss preferably includes one or more detent positions, stops or slots 44, such as one or more hemispherical recesses, for example, and preferably includes an upper detent position, stop or slot 44a, and a lower detent position, stop or slot 44b. In FIG. 4A, the latch lever is shown mounted in its support bracket, frame or plate, and the upper detent position, stop or slot is positively engaged by a spring loaded ball bearing 46 biased outwardly toward the upper detent position, stop or slot by a spring 47 located in a hole 48 in the support bracket back plate engaging with the upper detent position, stop or slot.

Figure 5:
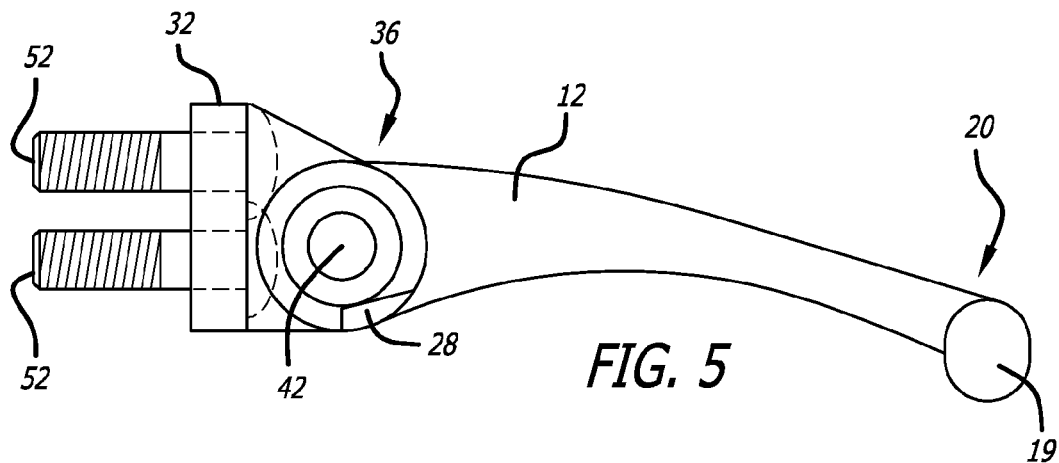
FIG. 5 is a side view of the latch lever of the latching system shown in FIGS. 1 and 2 in its lowered position.
Figure 6:
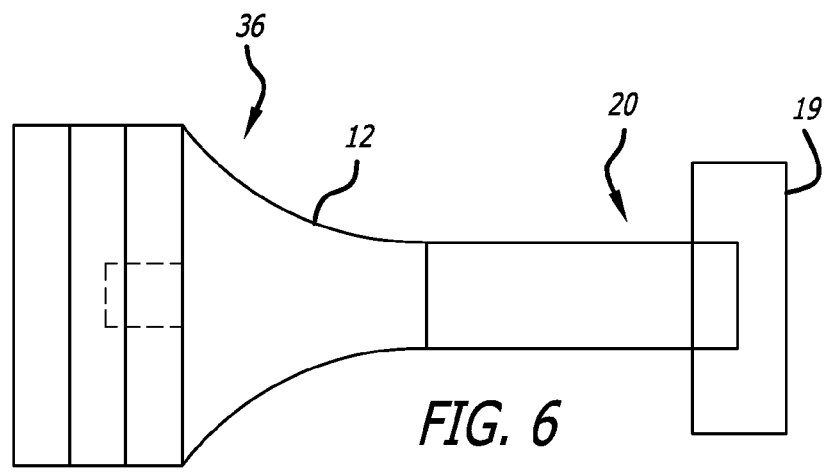
FIG. 6 is a top view of the latch lever of the latching system shown in FIGS. 1 and 2.
Figure 7:
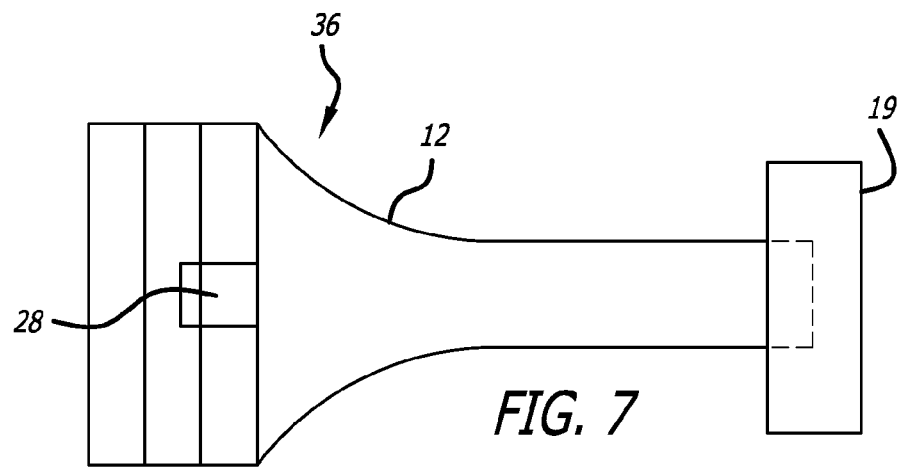
FIG. 7 is a bottom view of the latch lever of the latching system shown in FIGS. 1 and 2.
Figure 8:
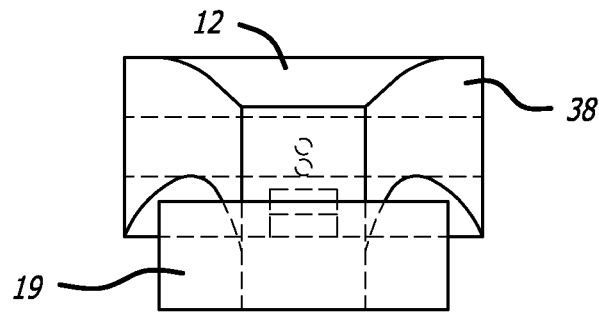
FIG. 8 is a front elevation of the latch lever of the latching system shown in FIGS. 1 and 2.
Figure 9:
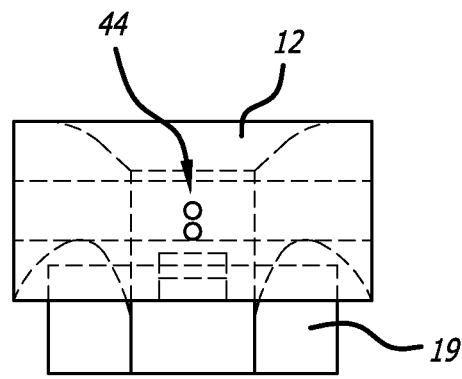
FIG. 9 is a rear elevation of the latch lever of the latching system shown in FIGS. 1 and 2.
Figure 10:
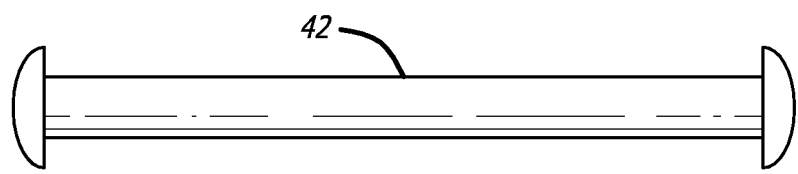
FIG. 10 depicts the pivot pin for securing the latch lever of the latching system shown in FIGS. 1 and 2 to its mounting.

The support bracket is typically secured by one or more through bolts 52, engaging in threaded holes or inserts in structurally bonded blocks integrated into the molded work deck panel, or into a work deck beam integrated with or mounted to the galley, for example. FIG. 5 shows an alternative through bolt pattern as is further shown in FIGS. 13 and 14. While a T bar configuration on the end of the latch lever is shown, L-shaped, C-shaped, P-shaped, or other configurations can alternatively be employed.

Figure 11:
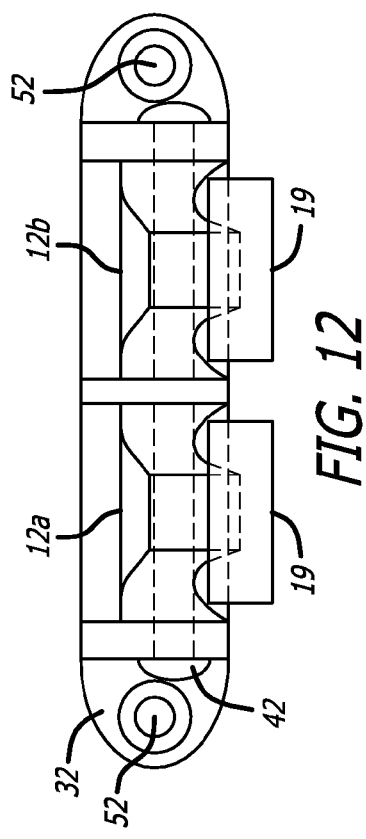
FIGS. 11-18 depict variations of support bracket configurations in accordance with the present invention.
Figure 12:
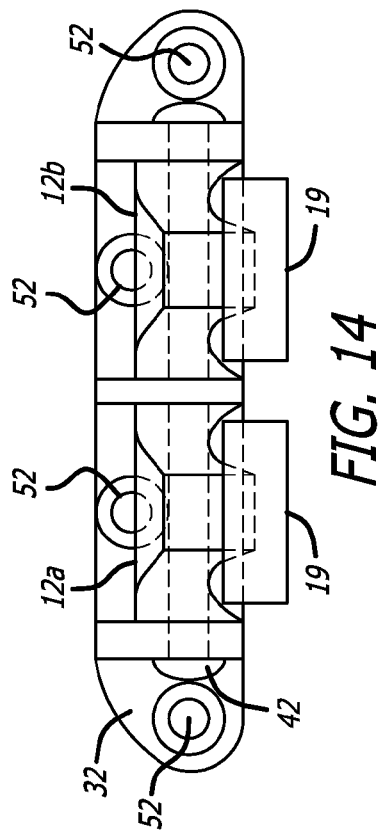
Figure 13:
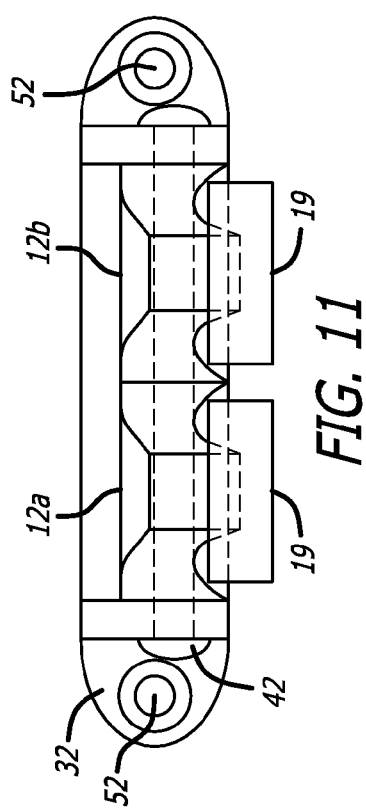
Figure 14:
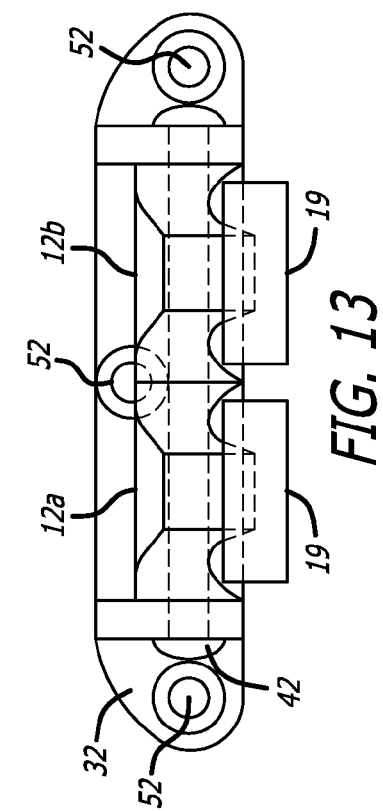
Figure 15:
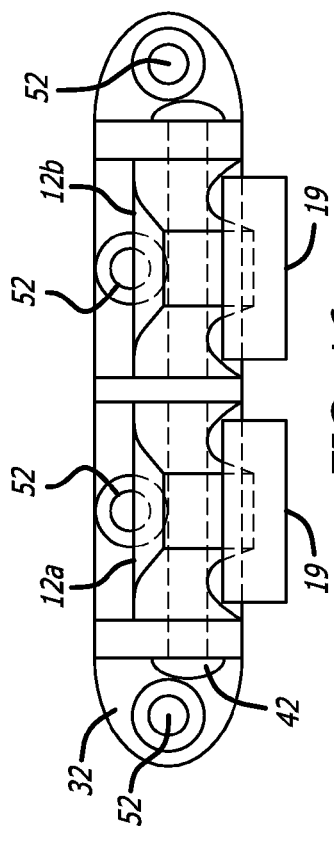
Figure 16:
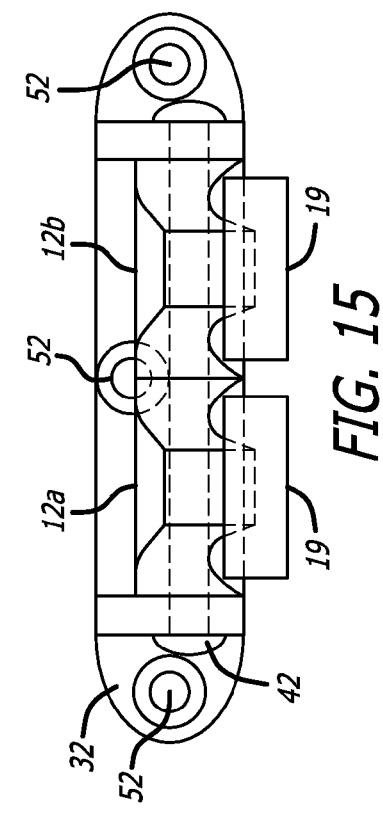
Figure 17:
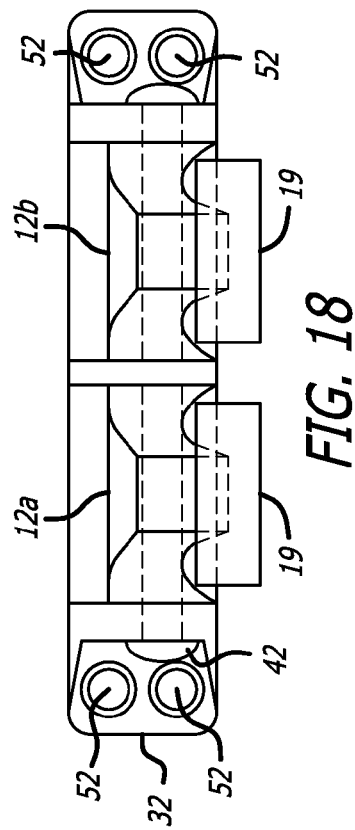
Figure 18:
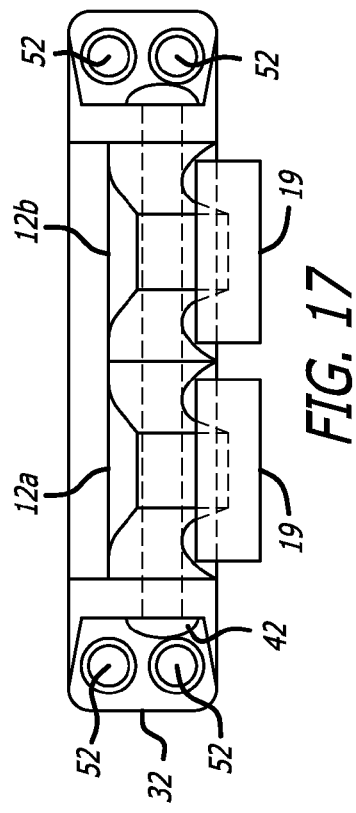

FIGS. 11-18 depict alternative embodiments of support bracket configurations. FIG. 11 has a two bolt fixing with the pivot pin supported at both ends only. FIG. 12 has a two bolt fixing with the pivot pin supported at both ends as well as in the center. FIG. 13 has a three bolt fixing with the pivot pin supported at both ends only and has re-spaced outboard fixing bolts. FIG. 14 has a four bolt fixing with the pivot pin supported at both ends and in the center in addition to having re-spaced outboard fixing bolts. FIG. 15 has a three bolt fixing with the pivot pin supported at both ends only. FIG. 16 has a four bolt fixing with the pivot pin supported at both ends and in the center. FIG. 17 has a four bolt fixing with two bolts at each end and the pivot pin is supported at both ends only. FIG. 18 has a four bolt fixing with two bolts at each end and the pivot pin supported at both ends and in the center. Additional inboard fixings could be added to the bracket configurations shown in FIGS. 17 and 18. Only the brackets illustrated in FIGS. 11, 12, 17 and 18 can be unbolted from a galley as a single unit while the brackets shown in FIGS. 13, 14, 15 and 16 would require the removal of the pivot pin to access the inboard fixings.

While particular forms of the invention have been illustrated and described, it will be apparent to those skilled in the art that various modification can be made without departing from the spirit and scope of the invention. Accordingly, it is not intended that the invention be limited except by the appended claims.

What is claimed is:

1. A latching system for latching and unlatching a door of a galley cart bay of an aircraft galley, said galley cart bay door mounted to said galley cart bay of said aircraft galley for releasably retaining said aircraft galley cart within the galley cart bay, said galley cart bay door being movable between a closed position closing the galley cart bay for retaining the aircraft galley cart within the galley cart bay and an open position for releasing the aircraft galley cart for removal from the galley cart bay; said latching system comprising:
at least one latch lever having an inner and an outer end, said inner end being pivotally mounted to the aircraft galley, said outer end of said at least one latch lever including a lever retainer member releasably engageable with a portion of the galley cart bay door, said outer end of said at least one latch lever being pivotally movable between a door engaging position engaging said galley cart bay door and retaining said galley cart bay door in the closed position and a door releasing position releasing said galley cart bay door to move to the open position, and said inner end of said at least one latch lever including a cam slot releasably engageable with a cam operated rod slidably mounted between said cam slot and an interior side of said galley cart bay door.

2. The latching system of claim 1, wherein said inner end of said at least one latch lever includes a mounting boss including upper and lower detent stops, and said inner end of said at least one latch lever is pivotally mounted in a support bracket connected to the aircraft galley, said support bracket including a detent biased outwardly to alternatingly removably engage one of said upper and lower detent stops of said mounting boss.

3. The latching system of claim 2, wherein said detent comprises a spring loaded detent.

4. The latching system of claim 2, wherein said detent comprises a spring loaded ball bearing located in a hole in the support bracket.

5. The latching system of claim 2, wherein said upper and lower detent stops comprise hemispherical recesses in said mounting boss.

6. The latching system of claim 1, further comprising a compression spring disposed intermediate said cam slot and said cam operated rod, said compression spring being biased to cause said cam operated rod to push outwardly against said cart bay door when said cart bay door is in the closed position and when said at least one latch lever is moved to said open position.

7. The latching system of claim 1, wherein said lever retainer member comprises a lever T bar retainer member.

8. The latching system of claim 1, wherein said galley cart bay door includes at least one positive location nub extending outwardly from said galley cart bay door and said lever retainer member is releasably engageable with said at least one positive location nub in said door engaging position of said outer end of said at least one latch lever.

9. The latching system of claim 8, further comprising a door seal disposed between an interior side of the galley cart bay door and the galley cart bay for sealing the galley cart bay door against the galley cart bay in the closed position of the galley cart bay door, and wherein said at least one positive location nub is configured to cause said at least one latch lever to compress said door seal against the galley cart bay in the closed position of the latch lever when said galley cart bay door is closed and said outer end of said at least one latch lever is in said door engaging position, such that positive closure of said galley cart bay door is achieved by depressing said at least one latch lever past said at least one positive location nub.

10. The latching system of claim 9, wherein said at least one positive location nub comprises first and second positive location nubs, and positive closure is achieved by depressing said at least one latch lever past said first and second positive location nubs.

11. The latching system of claim 1, wherein when said galley cart bay door is moved to said closed position, said cam rod is pushed against said compression spring and said cam slot, and is operative to move said at least one latch lever to said door engaging position.

12. The latching system of claim 1, wherein said at least one latch lever comprises first and second latch levers independently releasably engageable with said portion of said galley cart bay door.

13. The latching system of claim 12, wherein said first and second latch levers are mounted in a support bracket, said inner ends of said first and second latch levers each including a mounting boss including upper and lower detent stops, and said inner ends of said first and second latch levers each being pivotally mounted in a support bracket connected to said aircraft galley, said support bracket including detents biased outwardly to alternatingly removably engage one of said upper and lower detent stops of said mounting bosses of said first and second latch levers to provide independent primary and secondary latching of the cart bay door.

14. A latching system for latching and unlatching a galley cart bay door of a galley cart bay of an aircraft galley for receiving an aircraft galley cart within the galley cart bay, the galley cart bay door being movable between a closed position closing said galley cart bay for retaining said aircraft galley cart within the galley cart bay and an open position for releasing said aircraft galley cart for removal from the galley cart bay, the latching system comprising:
first and second latch levers each having an inner and an outer end, said inner ends of said first and second latch levers each being pivotally mounted to the aircraft galley, said outer ends of said first and second latch levers each including a lever retainer member releasably engageable with corresponding first and second lever receiving portions of the galley cart bay door, respectively, said outer ends of said first and second latch levers each being independently movable between a door releasing position releasing said galley cart bay door to move to the open position and a door engaging position releasably engaging said corresponding first and second lever receiving portions of said galley cart bay door and retaining said galley cart bay door in the closed position, said inner ends of said first and second latch levers including corresponding cam slots, respectively, said corresponding cam slots being releasably engageable with corresponding cam operated rods slidably mounted between said corresponding cam slots and an interior side of said cart bay door, said inner ends of said first and second latch levers each including corresponding compression springs disposed intermediate said corresponding cam slots and said corresponding cam operated rods, said compression springs being biased to cause said corresponding cam operated rods to push outwardly against said cart bay door when said cart bay door is in the closed position and when either or both of said first and second latch levers are moved to said open position; and said first and second lever receiving portions of said galley cart bay door each including corresponding positive location nubs extending outwardly from said galley cart bay door, said lever retainer members being releasably engageable with said corresponding positive location nubs of said corresponding first and second lever receiving portions of said galley cart bay door in said door engaging position of said outer ends of said first and second latch levers.

15. The latching system of claim 14, further comprising a door seal disposed between an interior side of the galley cart bay door and the galley cart bay for sealing the galley cart bay door against the galley cart bay in the closed position of the galley cart bay door, and wherein said corresponding positive location nubs are configured to cause said first and second latch levers to compress said door seal against the galley cart bay in the closed position of the latch lever when said galley cart bay door is closed and said outer end of said first and second latch levers is in said door engaging position, such that positive closure of said galley cart bay door is achieved by depressing said first and second latch levers past said corresponding positive location nubs.

16. The latching system of claim 14, wherein when said galley cart bay door is moved to said closed position, said corresponding cam rods are configured to be pushed against said corresponding compression springs and said corresponding cam slots, and are operative to move said first and second latch levers to said door engaging position.

17. The latch of claim 14, wherein said first and second latch levers are mounted in a support bracket, said inner ends of said first and second latch levers each including a mounting boss including upper and lower detent stops, and said inner ends of said first and second latch levers each being pivotally mounted in a support bracket connected to said aircraft galley, said support bracket including first and second detents biased outwardly to alternatingly removably engage corresponding ones of said upper and lower detent stops of said mounting bosses of said first and second latch levers to provide independent primary and secondary latching of the cart bay door.

18. The latching system of claim 17, wherein said first and second detents comprise spring loaded detents.

* * * * *